United States Patent [19]
Minakata et al.

[11] Patent Number: 5,991,067
[45] Date of Patent: Nov. 23, 1999

[54] OPTICAL WAVEGUIDE SUBSTRATE, OPTICAL WAVEGUIDE DEVICE, SECOND HARMONIC GENERATION DEVICE, AND PROCESS OF PRODUCING OPTICAL WAVEGUIDE SUBSTRATE

[75] Inventors: Makoto Minakata, Hamamatsu; Tatsuo Kawaguchi, Motosu-Gun; Minoru Imaeda, Nagoya, all of Japan

[73] Assignee: NGK Insulators, Ltd., Japan

[21] Appl. No.: 08/922,565

[22] Filed: Sep. 3, 1997

[30] Foreign Application Priority Data

Sep. 6, 1996 [JP] Japan ................................ 8-236246

[51] Int. Cl.$^6$ ........................................................ G02F 1/37
[52] U.S. Cl. ......................... 359/332; 359/328; 385/122; 385/132
[58] Field of Search ........................... 385/122, 129–132; 359/326, 328, 332

[56] References Cited

U.S. PATENT DOCUMENTS

| | | | |
|---|---|---|---|
| 5,172,385 | 12/1992 | Forrest et al. | 385/130 X |
| 5,274,727 | 12/1993 | Ito et al. | 385/122 |
| 5,333,231 | 7/1994 | Fukuda et al. | 385/122 |
| 5,363,462 | 11/1994 | Hung et al. | 385/122 |
| 5,866,200 | 2/1999 | Yoshino et al. | 427/163.2 |

FOREIGN PATENT DOCUMENTS

| | | |
|---|---|---|
| 0 699 934 | 3/1996 | European Pat. Off. . |
| 0 707 096 | 4/1996 | European Pat. Off. . |
| 0 803 747 | 10/1997 | European Pat. Off. . |
| 0 816 880 | 1/1998 | European Pat. Off. . |
| 4-123018 | 4/1992 | Japan . |
| 6-317718 | 11/1994 | Japan . |

OTHER PUBLICATIONS

"Ridge Type Optical Waveguide", OQE77–57, Oct. 24, 1977, Institute of Electronics, Japanese w/no translation.

*Primary Examiner*—John D. Lee
*Attorney, Agent, or Firm*—Wall Marjama Bilinski & Burr

[57] ABSTRACT

An optical waveguide substrate having a substrate made of ferroelectric optical single crystal and a ridge portion projected from a main plane of the substrate, has a construction such that the ridge portion has a base portion made of ferroelectric optical single crystal and an optical waveguide formed on the base portion. The optical waveguide substrate is formed by forming at least one optical waveguide layer on a main plane of a substrate made of ferroelectric optical single crystal, and mechanically working main planes of the optical waveguide layer and the substrate to form a ridge portion projected from the main plane of the substrate. The optical waveguide substrate can reduce a light transmission loss, increase an extinction ratio, and improve an electric field applying efficiency.

7 Claims, 10 Drawing Sheets

FIG_1a

FIG_1b

FIG_1c

FIG_2a

FIG_2b

FIG_3a

FIG_3b

FIG_5

FIG_6

FIG_10a PRIOR ART

FIG_10b PRIOR ART

OPTICAL WAVEGUIDE SUBSTRATE, OPTICAL WAVEGUIDE DEVICE, SECOND HARMONIC GENERATION DEVICE, AND PROCESS OF PRODUCING OPTICAL WAVEGUIDE SUBSTRATE

BACKGROUND OF THE INVENTION (1) Field of the Invention

The present invention relates to an optical waveguide substrate and an optical wave guide device using the above optical waveguide substrate which is used preferably in conjunction with high speed optical modulators optical switching devices, a second harmonic generation device. The invention also relates to a process of producing the optical waveguide substrate.

(2) Related Art Statement

The ridge type optical waveguide is used as part of optical modulators, optical switching devices and so on. In the field of the high speed optical modulators and switching devices for optical communications, a modulator or a switching device produced by forming an optical waveguide element by diffusing titanium into lithium niobate single crystal, which can modulate or switch optical signals with a high speed more than 10 GHz, is known. Moreover, as a light source for blue laser preferably used for an optical pick-up and so on, a second harmonic generation (SHG) device of quasi phase matched (QPM) type, in which a periodic polarization inversion construction is formed in lithium niobate single crystal or lithium tantalate single crystal and then an optical waveguide portion is formed by using a proton exchange method, is also known. The second harmonic generation device mentioned above can be widely applied to devices for optical disk memory, medical use, photochemical use, optical measurement use, and so on.

Generally, as a method of forming an optical waveguide having a ridge construction, a method of transferring a mask pattern on a substrate by means of a photolithography technique and removing a portion other than the mask pattern by means of an ion etching is known. In the case of an optical modulator for modulating intensity, phase, wavelength and so on of a light, in which electrodes for applying an alternating electric field for modulating are arranged with respect to the ridge type optical waveguide, it is theoretically known that, if a ridge angle becomes near to 90° more and more, an applied electric field correction factor is increased correspondingly and a driving voltage can be reduced (Japanese Patent Laid-Open Publication No. 4-123018). In the JP-A-4-123018 mentioned above, a ratio of d/W in the ridge type optical waveguide between a height d and a width W of the ridge portion is set to larger than 0.1 and smaller than 1.0, and a ridge angle of the ridge portion is set to 90°±10°, so that the applied electric field correction factor increases as large as possible.

Figure 10A:
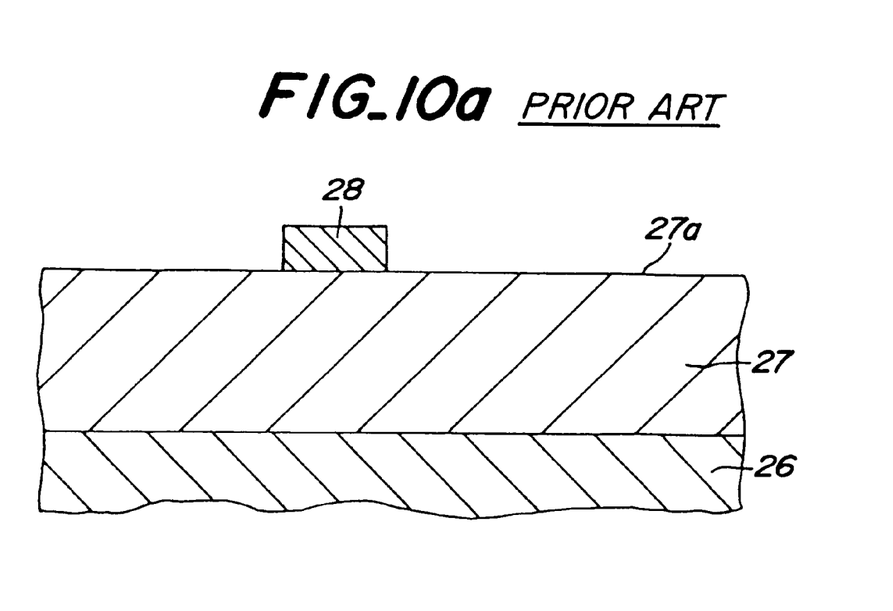
FIGS. 10a and 10b are schematic cross sectional views respectively depicting one ridge type optical waveguide producing process according to the known method.
Figure 10B:
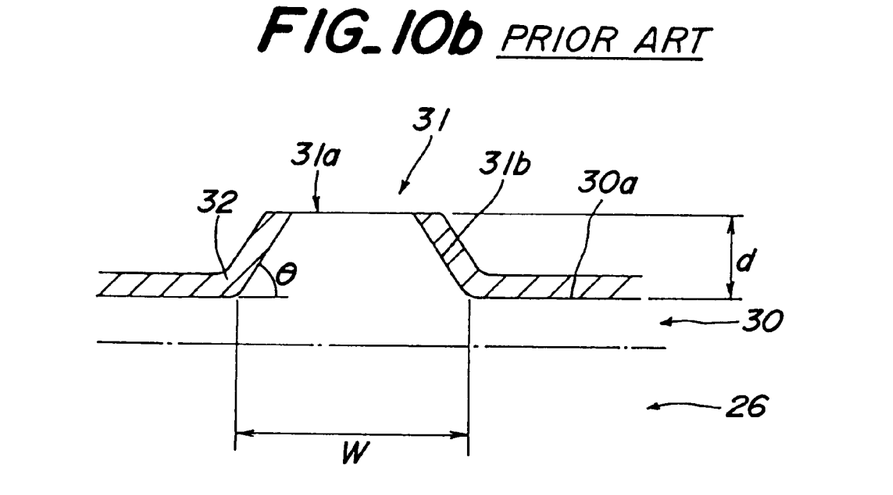

However, according to this known method in which a portion other than the mask pattern is removed by using the ion etching, it is difficult to make a ridge angle 90° for the following reason. As shown in FIGS. 10a and 10b, in the known method, an epitaxial layer 27 is formed on a substrate 26 made of electrooptical single crystal, and a mask 28 having a predetermined pattern is formed on a main plane 27a of the epitaxial layer 27 by using a photolithography method. Then, the epitaxial 27 is etched to form a ridge type optical waveguide 31. In this case, since a portion of the epitaxial layer 31a other than a portion covered by the mask 28 is removed, a thickness of an epitaxial layer 30 formed by etching the epitaxial layer 27 becomes smaller, as shown in FIG. 10b. Up to now, the known ridge type optical waveguide 31 having a ratio of d/W larger than 1.0 has not been achieved.

As a result an improvement of the applied electric field correction factor is limited. That is, in the known optical modulator, a surface 31a of the ridge type optical waveguide 31 is substantially flat, and a side surface 31b is inclined. Moreover, an electrode layer 32 for modulation is formed on a main plane 30a of the epitaxial layer 30 and on the inclined side surface 31b. Therefore, as discussed in "RIDGE TYPE OPTICAL WAVEGUIDE", OQE77-57, Oct. 24, 1997, Institute of Electronics, Information and Communication Engineers, if an alternating electric field for modulation is applied to the optical waveguide 31, the modulation efficiency using the alternating electric field is decreased in comparison to an optical waveguide in which a ridge angle is 90°, thereby increasing driving voltage.

The side surface 31b is inclined for the following reasons. In the known optical modulator, the ridge type optical waveguide 31 is projected from the main plane 30a of the epitaxial layer 30. In this case, in order to increase a ratio d/W between a height d and a width W of the ridge type optical waveguide 31 (i.e., in order to make the ridge type optical waveguide 31 thinner), it is necessary to etch a portion around the ridge type optical waveguide 31 as deep as possible. However, since a ratio of etching rate between a substrate side portion (epitaxial layer 27 and substrate 26) and the mask 28 is 2.5(substrate side portion):1(mask), it is necessary to use a mask having a large thickness to allow for deep etching of the portion around the ridge type optical waveguide 31. Since the mask 28 has a large thickness, the etching liquid is not sufficiently supplied near the mask 28. Thus an etching rate of the portion near the mask 28 is decreased, so that a ridge angle ($\theta$) is extremely decreased from 90°. For example, if a height d of the ridge type optical waveguide 31 is set to larger than 2 $\mu$m, it is difficult to achieve a ridge angle ($\theta$) of 90°.

Japanese Patent Laid-Open Publication No. 4-123018 aims at solving these problems mentioned above, but the fundamental defect explained with reference to FIGS. 10a and 10b is not solved at all. This publication only limits a dimension of the known ridge type optical waveguide.

Moreover, the ridge type optical waveguide substrate shown in FIGS. 10a and 10b is used generally for an optical coupling with an end surface of optical fibers. In this case, it is necessary to reduce a coupling loss as much as possible, and also it is necessary to reduce a transmission loss in the optical waveguide. Further, in the case that a single mode light is incident upon the ridge type optical waveguide, it is necessary to improve an extinction ratio more and more.

SUMMARY OF THE INVENTION

An object of the invention is to eliminate the drawbacks mentioned above and to provide an optical waveguide substrate and an optical waveguide device having a ridge type optical waveguide in which a light transmission loss can be reduced, a coupling loss with optical fibers can be reduced, and an extinction ratio in the case of a single mode optical waveguide can be improved.

Another object of the invention is to provide an optical waveguide device having an optical waveguide with electrodes for modulation in which an electric field applying efficiency can be improved and a driving voltage necessary for modulating light can be reduced.

Still another object of the invention is to provide a process of producing an optical waveguide substrate having the optical waveguide mentioned above.

According to the invention, an optical waveguide substrate having a substrate made of ferroelectric optical single crystal and a ridge portion projected from a main plane of said substrate, comprises a construction such that said ridge portion has a base portion made of ferroelectric optical single crystal and an optical waveguide formed on said base portion.

Moreover, according to the invention, an optical waveguide device having the optical waveguide substrate mentioned above, comprises a construction such that said ferroelectric optical single crystal is made of electrooptical single crystal, and a pair of electrodes for applying a voltage for modulating light transmitted through said optical waveguide and a power supply device for supplying power to said electrodes are provided.

Further, according to the invention, a second harmonic generation device of quasi phase matched type having a substrate made of ferroelectric optical single crystal and a ridge portion projected from a main plane of said substrate comprising a construction such that said ridge portion has a base portion made of ferroelectric optical single crystal and an optical waveguide formed on said base portion, and a periodic polarization inversion construction is formed in said optical waveguide.

Furthermore, a process of producing an optical waveguide substrate comprises the steps of forming at least one optical waveguide layer on a main plane of a substrate made of ferroelectric optical single crystal, and mechanically working main planes of said optical waveguide layer and said substrate to form a ridge portion projected from the main plane of said substrate, which ridge portion has a base portion made of ferroelectric optical single crystal and an optical waveguide formed on said base portion.

The inventors investigated a method of forming a ridge type optical waveguide, having a large d/W ratio, on a substrate made of ferroelectric optical single crystal. The inventors found a process of forming an epitaxial layer on the substrate made of ferroelectric optical single crystal, and mechanically working the epitaxial layer and the substrate to form a ridge type optical waveguide. As far as the inventors know, such a method of forming the ridge type optical waveguide is not known.

As a result, the inventors have confirmed that the ridge type optical waveguide, having a larger d/W ratio than previously known (larger than 1 and smaller than 10) can be formed. Particularly, the ridge type optical waveguide having a d/W ratio of larger than 1 can not be formed by an ion etching method for the reasons mentioned above. Further, according to the invention, an optical waveguide substrate in which a ridge angle is substantially 90° can be formed.

Then, it is confirmed that the ridge type optical waveguide substrate having a base portion made of ferroelectric optical single crystal and an optical waveguide formed on the base portion can be formed by a mechanical working such as cutting. In the formed ridge type optical waveguide substrate, it is confirmed that a light distortion can be removed; a light transmission loss and a coupling loss with an optical fiber can be decreased much more, and an extinction ratio can be decreased.

DESCRIPTION OF THE PREFERRED EMBODIMENTS

Figure 1A:
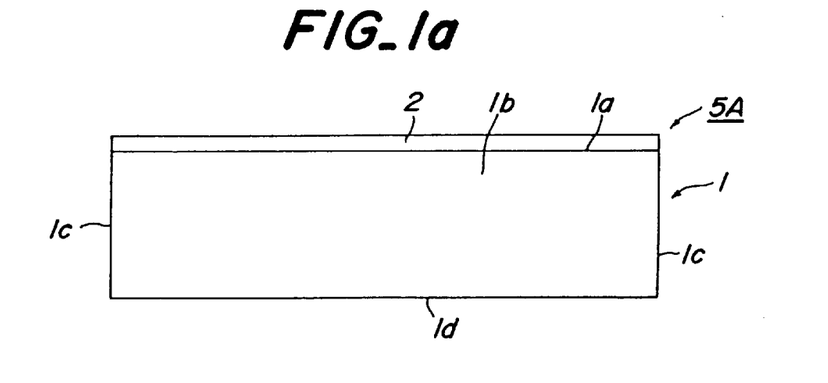
FIG. 1a is a side view showing a state such that a ferroelectric optical single crystal layer 2 is formed on a substrate 1.
Figure 1B:
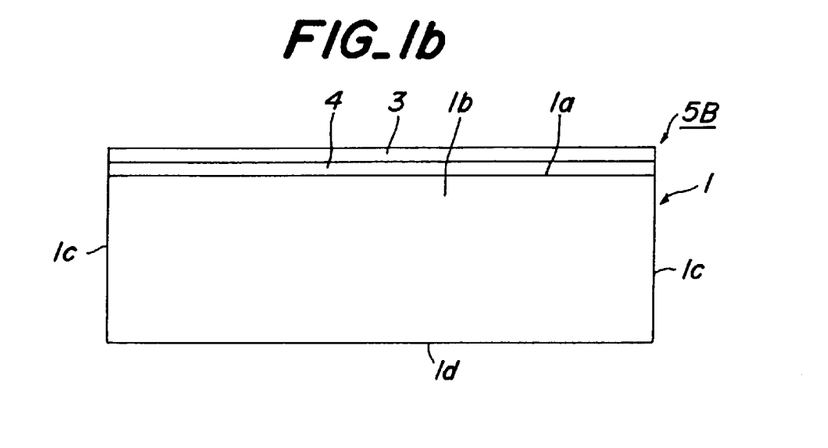
FIG. 1b is a side view illustrating a state such that ferroelectric optical single crystal layers 4 and 3 are formed on the substrate 1.

Hereinafter, the present invention will be explained with reference to the drawings. FIGS. 1a and 1b are front views respectively showing assemblies 5A and 5B. At first, a substrate 1 made of ferroelectric optical single crystal is prepared. Numerals 1a and 1d are main planes of the substrate 1, and numerals 1c and 1b are side surfaces thereof. In the embodiment shown in FIG. 1a, an optical waveguide layer 2 is formed on one main plane 1a of the substrate 1. In this embodiment, it is necessary to make a refractive index of the optical waveguide layer 2 larger than that of the substrate 1. As the optical waveguide layer 2, it is preferred to use an epitaxial layer of ferroelectric optical single crystal, but it is possible to use a titanium doped optical waveguide or a proton exchanged optical single crystal.

In the embodiment shown in FIG. 1b, epitaxial layers 4 and 3 are formed successively on the main plane 1a of the substrate 1. Moreover, in the case that the epitaxial layer 4 is used for the optical waveguide layer, it is necessary to make a refractive index of the epitaxial layer 3 larger than that of the epitaxial layer 4. In this case, there is not a special relation on the refractive index between the epitaxial layer 4 and the substrate 1.

Figure 1C:
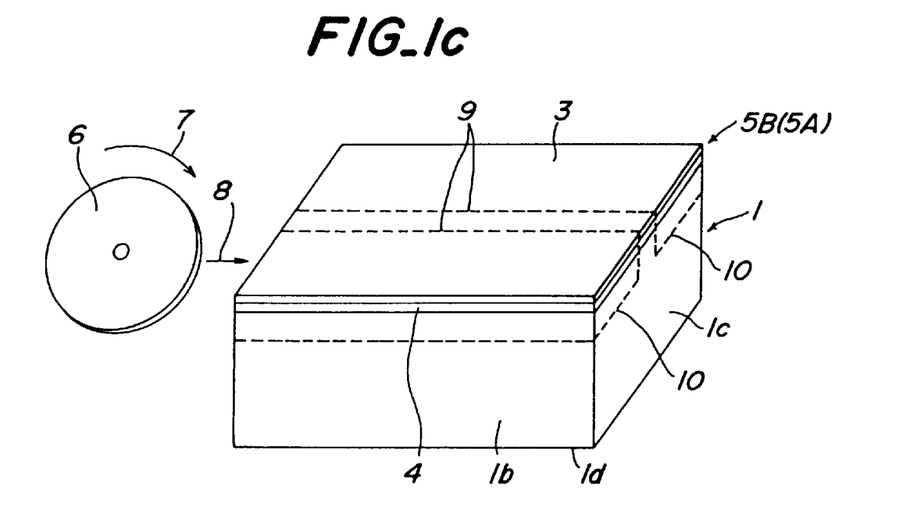
FIG. 1c is a schematic perspective view depicting a state in which the substrate 1 and the ferroelectric optical single crystal layers 4 and 3 are ground.

Then, as shown in FIG. 1c, a cutting operation is performed for the assembly 5B (or 5A) in a direction parallel to the side surface 1b. The cutting operation is not limited particularly, but it is preferred that the cutting operation is performed by using a rotation member having a cutting-blade. In the embodiment shown in FIG. 1c, the cutting operation is performed by using a rotation member 6 having the cutting-blade in such a manner that the rotation member 6 is moved like an arrow 8 while rotating like an arrow 7 so as to cut the substrate 1 and the epitaxial layers 3 and 4 at the same time. In this case, a moving direction of the rotation member 6 is parallel to the side surface 1b.

In this manner, by performing the cutting operation, the assembly 5B or 5A is cut along dotted lines 9 and 10. In this case, it is preferred that the cutting operation is performed in such a manner that the rotation member 6 is moved repeatedly in a direction parallel to the side surface 1b, and also a position of the rotation member 6 is moved gradually from the side surface 1b to the dotted line 9. In this manner, all the regions defined by the dotted lines 9 and 10 are removed.

Figure 2A:
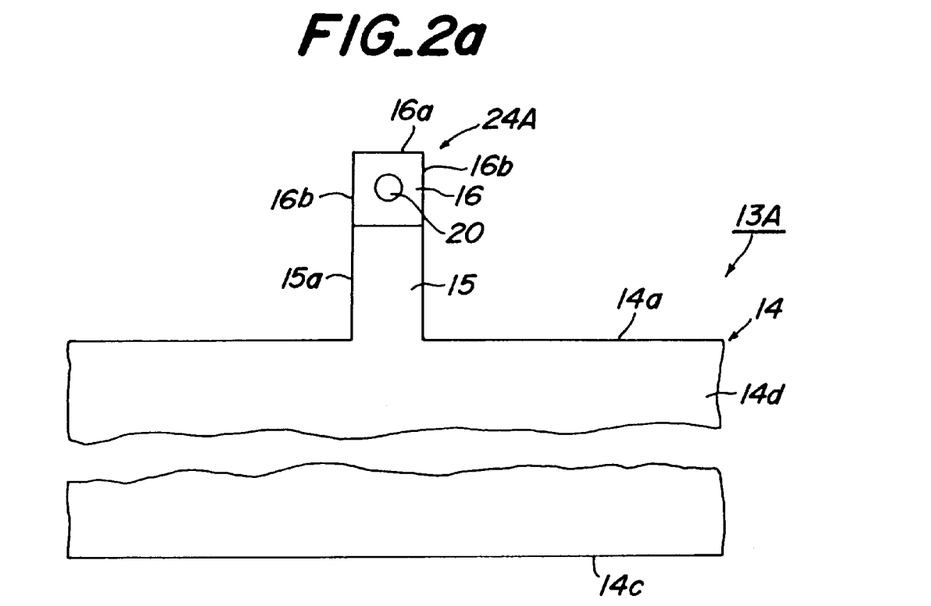
FIGS. 2a and 2b are front views respectively showing one embodiment of an optical waveguide device 13A or 13B according to the invention.
Figure 2B:
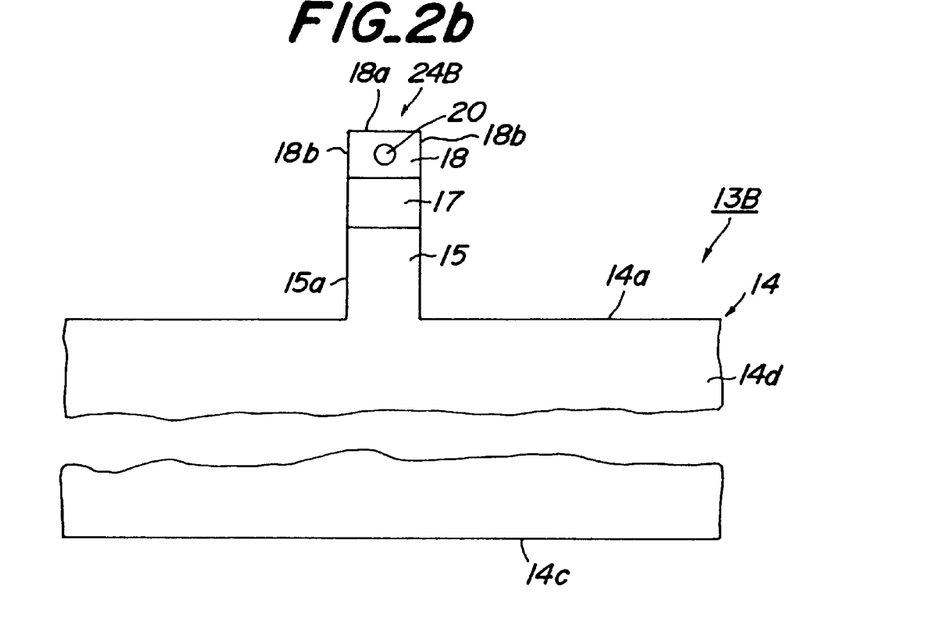

By cutting out a ridge portion from the assembly during the cutting operation, optical waveguide substrates 13A and 13B shown for example in FIG. 2a and FIG. 2b can be produced. In the optical waveguide substrate 13A shown in FIG. 2a, a ridge portion 24A is formed in such a manner that it is projected from a main plane 14a of a substrate 14. In this embodiment, a numeral 14c is the other main plane and a numeral 14d is a side surface. A base portion 15 of the ridge portion 24A is made from ferroelectric optical single crystal which consists the substrate 14, and an optical waveguide 16 made of an epitaxial layer is formed on the base portion 15.

In the optical waveguide substrate 13B shown in FIG. 2b, a ridge portion 24B is formed in such a manner that it is projected from the main plane 14a of the substrate 14. In this embodiment, the base portion 15 of a ridge portion 24B is made from ferroelectric optical single crystal which consists the substrate 14, and an epitaxial layer 17 and an optical waveguide 18 are formed on the base portion 15.

According to the invention, the ridge portion is formed by performing the cutting operation. Therefore, the optical waveguide in which a d/W ratio between a height d and a width W of the ridge portion is larger than 1, (preferably larger than 2) and a ridge angle is substantially 90° (90°±1°) can be obtained.

In the optical waveguide substrate mentioned above, a cross section of a light beam 20 transmitted in the optical waveguide 16 or 18 is substantially circular, and a distortion of the light beam 20 in not generated. This is because the base portion 15 is projected from the substrate 14 and the optical waveguide 16 or 18 is formed on the base portion 15. Therefore, the light beam 20 is not transmitted or scattered toward the substrate 14. Moreover, side surfaces 16b or 18b of the optical waveguide 16 or 18 are arranged parallel with each other, and a cross section of the optical waveguide 16 or 18 is square or rectangular. Therefore, a symmetrical property of the light beam 20 is high, and thus a light transmitting efficiency is increased most.

Figure 3A:
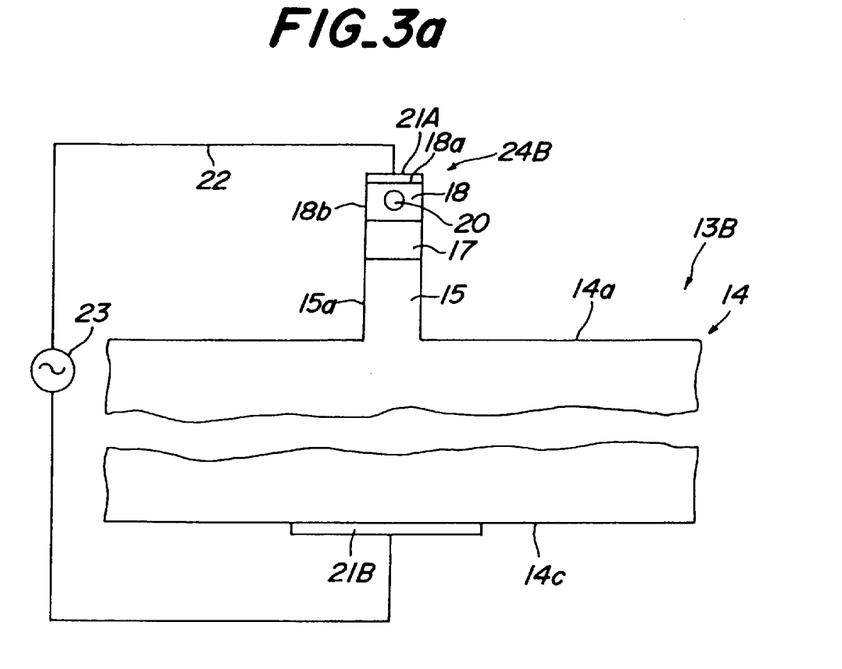
FIGS. 3a and 3b are front views respectively illustrating another embodiment of the optical waveguide device according to the invention.
Figure 3B:
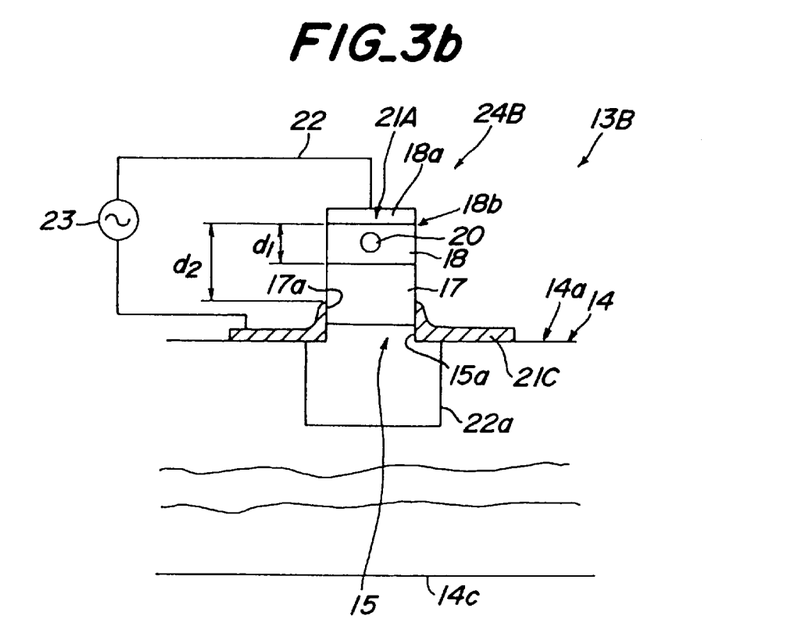
Figure 4:
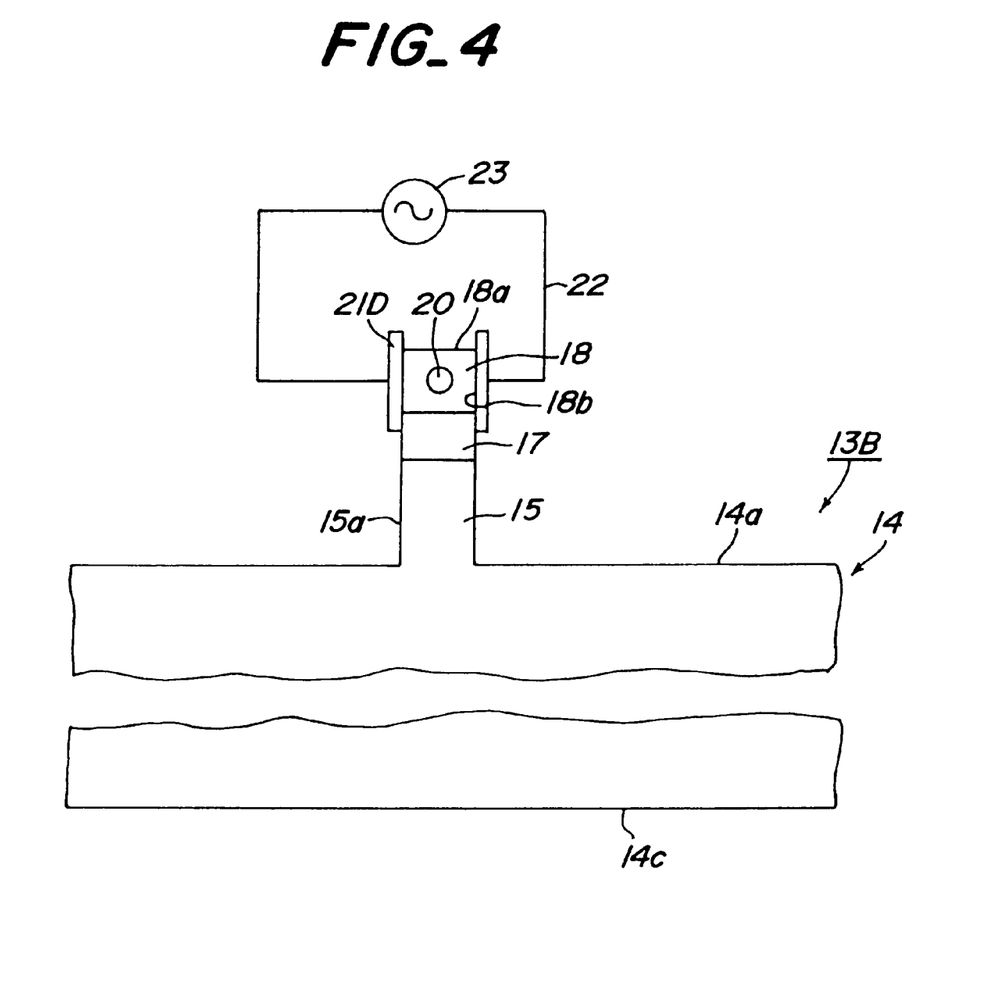
FIG. 4 is a front view depicting still another embodiment of the optical waveguide device according to the invention.

The optical waveguide substrate mentioned above can be applied to an optical waveguide device such as an optical switching device or an optical modulator for modulating an intensity or a phase of light. In this case, electrodes used for this light modulation are not limited, but electrodes shown in for example FIGS. 3a, 3b and 4 are preferably used. In the optical waveguide device shown in FIG. 3a using the optical waveguide substrate 13B (the optical waveguide substrate 13A can be also used for this purpose), an electrode 21A is arranged on a top surface 18a of the optical waveguide 18 and an electrode 21B opposed to the electrode 21A is arranged on a bottom surface 14c (the other main plane) of the substrate 14. The electrodes 21A and 21B are connected electrically via a power supply device 23 (preferably an alternating power source) by means of a wire 22. Therefore, a voltage is applied to the ridge portion 24B in a direction substantially parallel to a lengthwise direction (height direction) of the ridge portion 24B, and thus an electric field due to the applied voltage is applied to the optical waveguide 18. The optical waveguide device having the construction mentioned above is particularly preferred as a device using a Z plate made of lithium niobate.

In the optical waveguide device shown in FIG. 3b using the optical waveguide substrate 13B, the electrode 21A is arranged on the top surface 18a of the optical waveguide 18. Electrodes 21C are arranged in such a manner that the electrodes 21C are extended on a side surface 17a of the epitaxial layer 17, on a side surface 15a of the base portion 15 and on the main plane 14a of the substrate 14, respectively. The electrodes 21C are connected electrically by a wire 22a to maintain at the same potential. Moreover, the electrodes 21A and 21C are connected electrically via the power supply device 23 by means of the wire 22. Therefore, a voltage is applied to the optical waveguide 18 in its height direction.

In addition, in the case that the electrodes are arranged on the top surface of the optical waveguide 18 and on the side surfaces of the epitaxial layer 17 and the base portion 15, it is preferred to make a ratio of $d_2/d_1$ larger than 1 and smaller than 3 ($d_1$ is a height of the optical waveguide 18 and $d_2$ is a length from the top surface of the optical waveguide 18 to an upper end of the electrode 21C). If a ratio of $d_2/d_1$ is larger than 1, a necessary driving voltage can be substantially reduced and also the extinction ratio can be decreased extraordinarily. By contrast, if a ratio of $d_2/d_1$ is set to 1, then the driving voltage can be reduced to about ⅓ and the extinction ratio can be improved to 25 dB with respect to the known planar type device having the extinction ratio of 20 dB. Moreover, if a ratio of $d_2/d_1$ is set to 2, the driving voltage can be reduced to ½ and the extinction ratio can be improved to more than 35 dB. Further, if a ratio of $d_2/d_1$ is set to 3, the driving voltage is substantially same as that of the known planar type device and the extinction ratio can be improved to more than 40 dB.

In the optical waveguide device shown in FIG. 4, a pair of electrodes 21D are arranged on side surfaces 18b of the optical waveguide 18. The electrodes 21D are electrically connected via the power supply device 23 by means of the wire 22. Therefore, a voltage can be applied to the optical waveguide 18 through the electrodes 21D. The device having the construction mentioned above is particularly preferred as a device using Y plate or X plate of lithium niobate. In this case, it is confirmed that the driving voltage can be reduced to about ½ and the extinction ratio can be improved to larger than 40 dB in comparison to the planar device having the extinction ratio of 20 dB.

It should be noted that, if the optical waveguide substrate 13A shown in FIG. 2a in spite of the optical waveguide substrate 13B, the optical waveguide device having the construction shown in FIG. 3a, 3b or 4 can be produced. Moreover, in this case, it is necessary to form the electrode 21A on the top surface 16a of the optical waveguide 16 in the case of FIG. 3a or 3b and to form the electrodes 21D on the side surfaces 16b of the optical waveguide 16.

In the optical waveguide device according to the present invention, an optical device which achieves a predetermined function can be produced if combined with the other optical waveguide substrate. For example, in FIG. 5, a pair of optical waveguide substrates 25A and 25B are combined with the optical waveguide device according to the invention, so as to form an optical modulator of Mach-Zehnder type.

Figure 5:
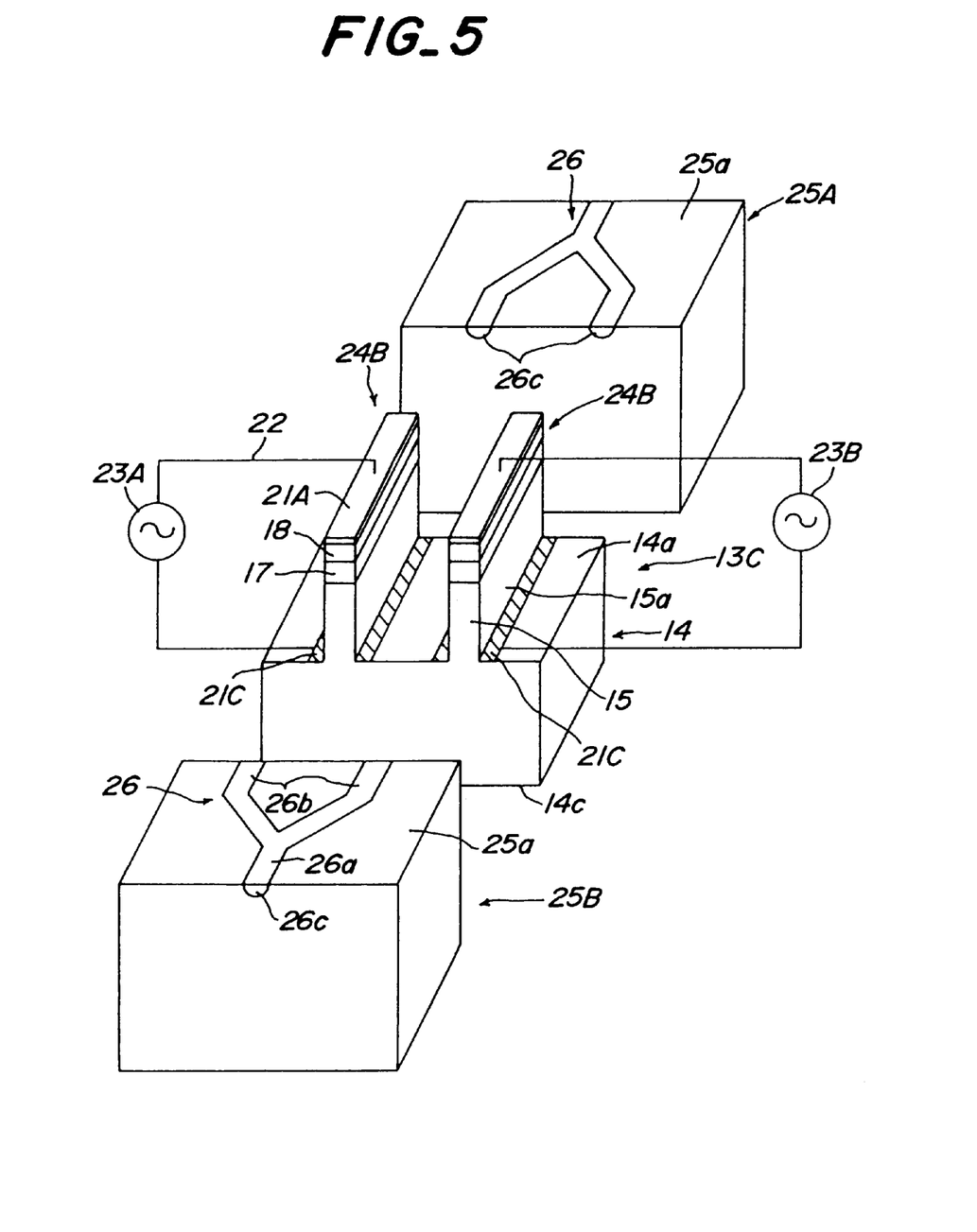
FIG. 5 is a perspective view showing a pair of optical waveguide substrates 25A and 25B and one embodiment of an optical waveguide device 13C according to the invention.

In this embodiment, a construction of an optical waveguide substrate 13C is the same as that of the optical waveguide substrate 13B. That is to say, the optical waveguide substrate 13C can be formed by the same mechanical working. The different point is that the optical waveguide substrate 13C has two ridge portions 24B extended parallel in its lengthwise direction. Respective ridge portion 24B has the base portion 15, the epitaxial layer 17 formed on the base portion 15, and the optical waveguide 18 formed on the epitaxial layer 17. The electrode 21A is arranged on the top surface 18a of the optical waveguide 18 and the electrode 21C opposed to the electrode 21A is arranged the main plane 14a of the substrate 14. The predetermined voltage can be respectively applied to the optical waveguide substrates 18 of the ridge portions 24B from the power supply sources 23A and 23B.

Figure 6:
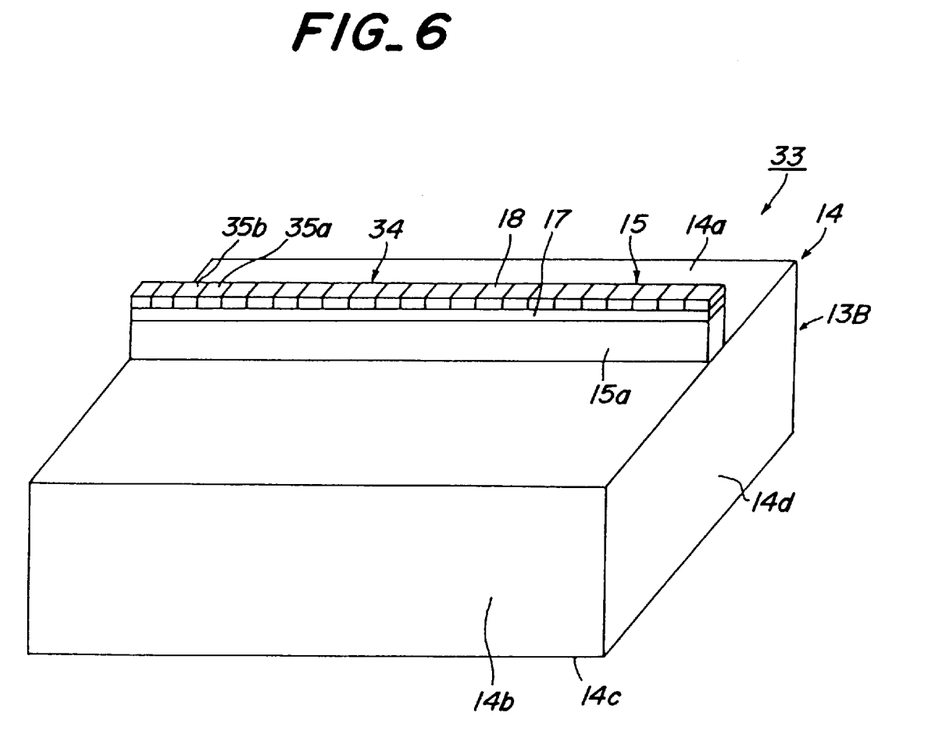
FIG. 6 is a perspective view illustrating schematically a state such that the optical waveguide device according to the invention is applied to a second harmonic generation device 33 of a quasi phase match having a periodic polarization inversion construction.

The optical waveguide substrates 24A and 24B are made of ferroelectric optical single crystal. Moreover, an optical waveguide 26 having a Y-shape is formed respectively in a main plane 25a of the optical waveguide substrates 24A and 24B. Respective optical waveguide 26 has a portion 26a substantially parallel to the optical waveguide 18 of the ridge portion and a branch portion 26b. Further, end surfaces 26c of the branch portions 26b are optically coupled with the optical waveguides 18 in such a manner that the ends of the optical waveguides 18 are connected to the end surfaces 26c of the optical waveguide substrate 25A, while the other ends of the optical waveguides 18 are connected to the end surfaces 26c of the optical waveguide substrate 25B. As this connection, an ultraviolet curable resin is preferably used. FIG. 6 is a perspective view showing one embodiment in which the optical waveguide device according to the invention is used as a second harmonic generation device of quasi phase matched type having a periodic polarization inversion construction. A second harmonic generation device 33 has the optical waveguide substrate 13B and a periodic polarization inversion construction 34 is formed in the optical waveguide 18. That is to say, as shown in FIG. 6 schematically, a plurality of periodic polarization inversion portions 35a and 35b are formed in the optical waveguide 18, and adjacent periodic polarization inversion portions 35a and 35b have an inverted polarization with each other.

In order to produce the second harmonic generation device 33, the optical waveguide substrate 14 is polarized in one predetermined direction, preferably in a direction perpendicular to the main plane 14a. Then, an epitaxial layer is formed on the substrate 14, and the cutting operation of the epitaxial layer and the substrate 14 is performed in the same manner as mentioned above. In this case, a polarization direction of the epitaxial layer is inverted with respect to the polarization direction of the substrate. Then, the periodic polarization inversion construction is formed according to the known method.

As a material of the substrate which can be used in the present invention, there are lithium niobate, lithium tantalate, solid solution of lithium niobate and lithium tantalate, solid solution of potassium lithium niobate and potassium lithium tantalate, and materials having a composition a part of which is substituted by magnesium or neodymium in the above materials. Moreover, as a material of the layer which can be formed on the substrate, there are lithium niobate, lithium tantalate, solid solution of lithium niobate and lithium tantalate, solid solution of potassium lithium niobate and potassium lithium tantalate, and materials having a composition a part of which is substituted by magnesium or neodymium in the above materials, in the same manner as mentioned above.

In a particularly preferred embodiment, a single crystal substrate of lithium niobate is used as the substrate, and a solid solution layer made of lithium niobate and lithium tantalate is formed on the substrate as the ferroelectric optical single crystal layer. This combination is understood impossible due to their solution rates. However, it is confirmed that, if a composition of the solid solution layer of lithium niobate and lithium tantalate is indicated by $LiNb_{1-x}Ta_xO_3$, a solid solution layer can be formed in a range of $0<x\leq 0.8$.

Moreover, in the other preferred embodiment, a single crystal substrate made of a solid solution of lithium niobate and lithium tantalate is used as the substrate, and a solid solution layer of lithium niobate and lithium tantalate is formed on the substrate as the ferroelectric optical single crystal layer. In this case, a composition of the single crystal substrate made of a solid solution of lithium niobate and lithium tantalate can be indicated by $LiNb_{1-z}Ta_zO_3$ ($0<z\leq 0.8$), and here a relation of $z<x$ is satisfied so that a relation of $0<z<0.8$ is also satisfied. That is to say, a substitution rate of tantalum in the solid solution layer is larger than that in the substrate.

In this embodiment, a solution to be contacted with the substrate consists mainly of $Li_2O$, $Nb_2O_5$, $Ta_2O_5$ and flux. An amount (mol %) of $Li_2O$ is substantially same as a sum amount (mol %) of $Nb_2O_5$, $Ta_2O_5$ and flux. This solution can be thought as a pseudo-ternary composition of $LiNbO_3$—$LiTaO_3$-solution solvent which consists of $LiNbO_3$ as a solute component, $LiTaO_3$ as a solute component, and flux as a solvent component. On the other hand, this solution can be thought as a pseudo-binary composition of $LiNb_{1-x}Ta_xO_3$-solution solvent which consists of $LiNb_{1-x}Ta_xO_3$ as a solute component and flux as a solvent component. As the flux, it is preferred to use $V_2O_5$, $B_2O_3$, $MoO_3$, and $WO_3$.

Figure 7:
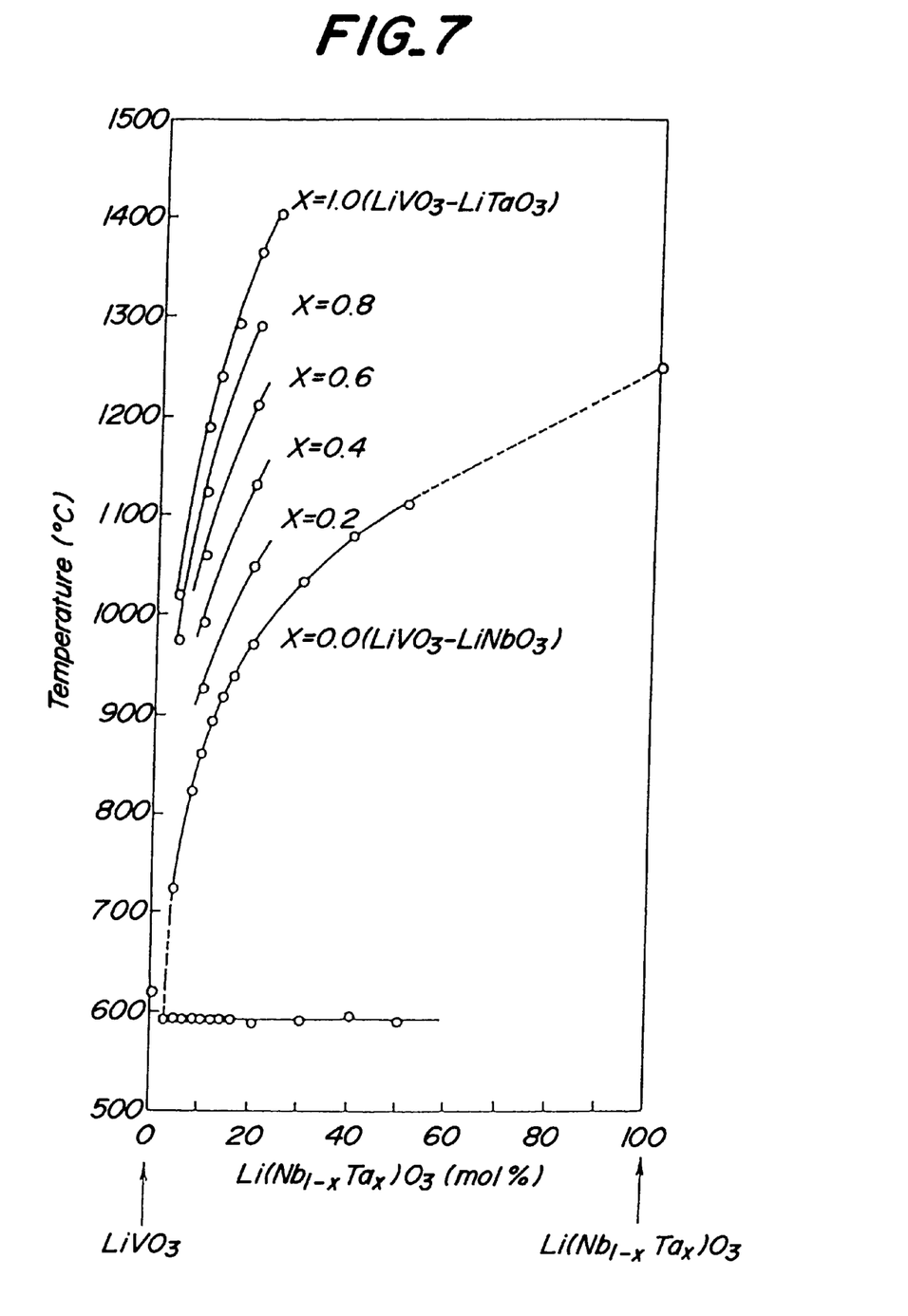
FIG. 7 is a graph depicting a pseudo-binary composition of $LiNb_{1-x}Ta_xO_3$—$LiVO_3$.

FIG. 7 is a graph showing a phase diagram of $LiNb_{1-x}Ta_xO_3$—$LiVO_3$ pseudo-binary composition. In FIG. 7, a horizontal axis shows an amount of $LiNb_{1-x}Ta_xO_3$ by mol %, and a vertical axis shows a ternary phase diagram of $LiNbO_3$—$LiTaO_3$—$LiVO_3$ pseudo-ternary composition. Respective values from 900 to 1300 show a saturation temperature at respective compositions.

Figure 8:
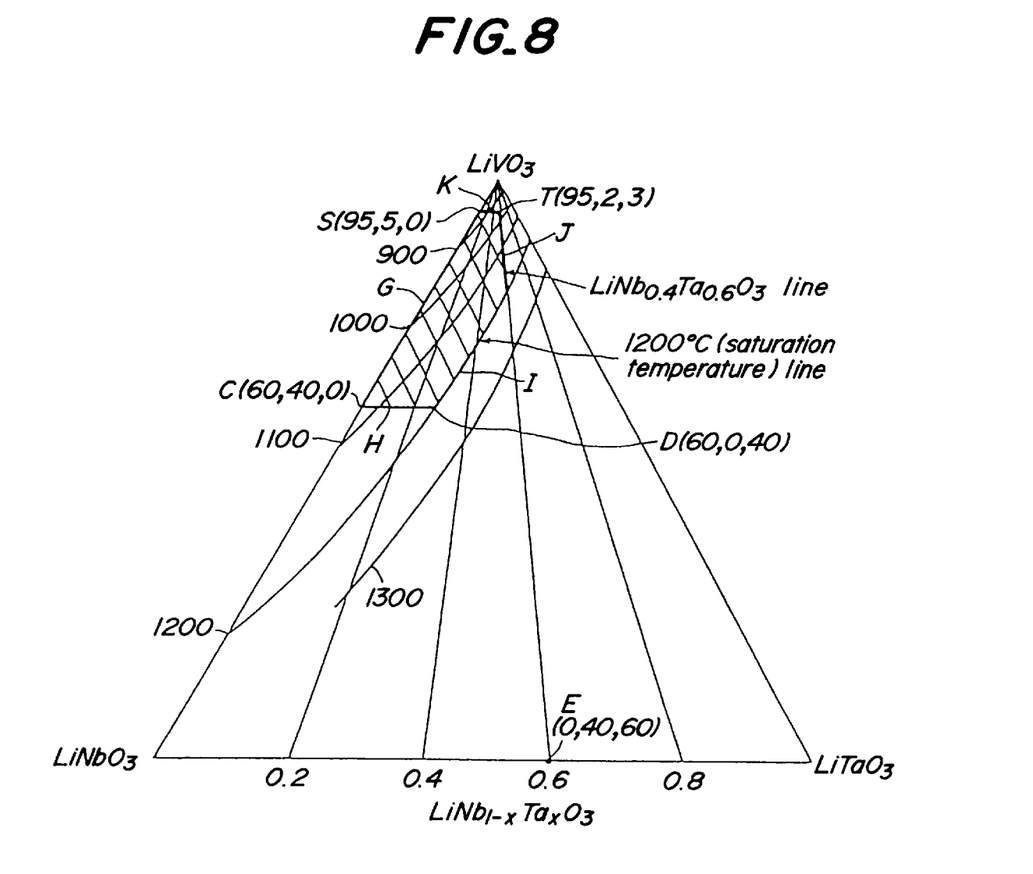
FIG. 8 is a graph showing a pseudo-ternary composition of $LiNbO_3$—$LiTaO_3$—$LiVO_3$.

At first, a composition of liquid phase at a saturation state must lie in a region of saturation temperature under 1200° C. This reason is as follows. Since a Curie point of lithium niobate single crystal substrate is about 1200° C., the substrate become a multi-domain state, if the substrate is contacted with a liquid phase portion having a temperature higher than 1200° C. Therefore, if crystallization of the substrate is damaged, then it is difficult to produce a high quality layer on the substrate. This composition region is shown by a curved line I in FIG. 8.

It is preferred to set a temperature of the liquid phase portion having a supercooling state lower than 1150° C. so as to produce a high quality layer. If a layer producing temperature is under 1150° C., a crystallization of the substrate is improved much more. Therefore, if the optical waveguide is formed in this layer, optical damage in the optical waveguide is extremely decreased. Moreover, since it is difficult to form the above solid solution layer if a layer producing temperature is not higher than 750° C., it is preferred to set a layer producing temperature higher than 750° C.

Moreover, a composition region in which the solution mentioned above can be produced is a hatched region in FIG. 8. Here, numerals in brackets show the molecular number of $LiVO_3$, molecular number of $LiNbO_3$, and the molecular number of $LiTaO_3$.

In this case, it is confirmed that it is necessary to set a ratio of (molecular number of $LiNbO_3$):(molecular number of LiTaO$_3$) to larger than 40%:smaller than 60%. This reason is not clear, but it is presumed as follows. Hereinafter, an explanation will be performed with reference to graphs shown in FIGS. 9a, 9b and 9c. In the graphs shown in FIGS. 9a, 9b and 9c, a vertical axis shows a solution rate or a precipitation rate, and a horizontal axis shows a ratio of molecular amount of LiTaO$_3$ with respect to molecular amount of LiNbO$_3$.

Figure 9A:
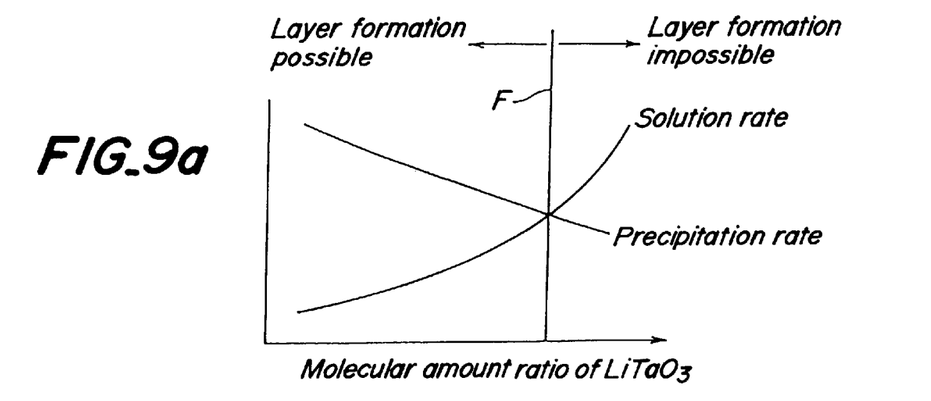
FIGS. 9a, 9b and 9c are graphs respectively illustrating a relation in FIG. 8 between an amount of $LiTaO_3$ and a solution rate of lithium niobate or a precipitation rate of a solid-solution layer on the substrate.
Figure 9B:
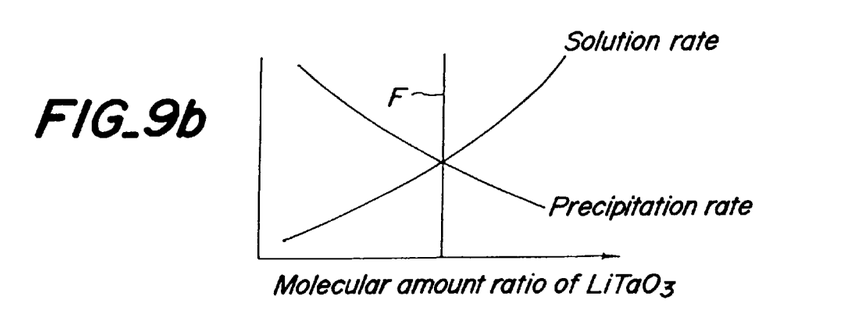
Figure 9C:
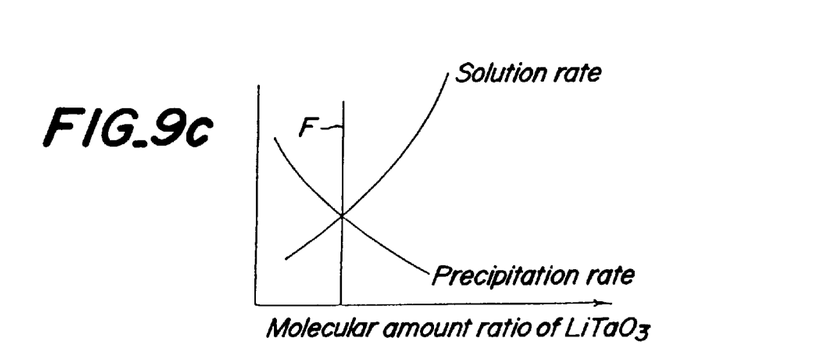

In order to precipitate the solid solution layer mentioned above on the lithium niobate single crystal substrate, a precipitation rate in which a solid phase is precipitated from a liquid phase must be set larger than a solution rate in which lithium niobate is dissolved into a liquid phase having a supercooling state. Moreover, if molecular amount of LiNbO$_3$ is smaller and smaller, i.e. if a position in the graph is moved right-handed much more, a solubility of lithium niobate with respect to the solution becomes larger and thus a precipitation rate of lithium niobate becomes larger correspondingly. On the other hand, if molecular amount of LiNbO$_3$ is smaller, a precipitation rate of lithium niobate becomes smaller correspondingly. As a result, it is understood that a solution rate of lithium niobate becomes larger than a precipitation rate of the solid solution layer at a some point F and a layer producing operation is not possible after this point F.

Moreover, it is confirmed that a supercooling rate of the liquid phase is important. FIG. 9a shows a graph in which a supercooling rate is large, FIG. 9b illustrates a graph in which a supercooling rate is smaller than that of FIG. 9a, and FIG. 9c depicts a graph in which a supercooling rate is smaller than that of FIG. 9b. From the results shown in FIGS. 9a to 9c, it is understood that, if a supercooling rate of the liquid phase becomes smaller and smaller, a precipitation rate of the solid solution layer becomes smaller and a temperature of the liquid phase increases, so that a solution rate of lithium niobate becomes larger. As a result, a molecular amount ratio of LiTaO$_3$ which can form a layer decreases.

From the graphs only, it is sufficient to make a supercooling rate larger so as increase a molecular amount ratio of LiTaO$_3$. However, if a supercooling rate becomes larger too excess, a supercooling state is not controlled stably. Actually, if a supper cooling rate is not smaller than 50° C., it is not possible to maintain a supercooling state.

From the reason mentioned above, a molecular amount ratio of LiTaO$_3$ which can form a layer has a limitation. When the molecular amount of LiNbO$_3$ is not larger than 40%, if a precise control is performed to decrease a supercooling rate near 50° C., it is not possible to form a layer. This composition region is indicated by a line J connecting a point T (95,2,3) and a point E (0,40,60) in FIG. 8.

Moreover, it is confirmed that a ratio between a solvent and a solute has a region which can form a layer. That is to say, in the case that a molecular amount of LiVO$_3$ is smaller than 60%, it is not possible to form a layer having a high quality. This reason is not also clear, but it is presumed as follows. In this case, if an amount of a solvent decreases, an amount of a solute component increases. Therefore, since a concentration of a solute in the liquid phase becomes dense, and a viscosity of the liquid phase portion increases. As a result, a layer generation is not performed smoothly, and a crystallization property is affected. This composition region is indicated by a line H connecting a point C (60,40,0) and a point D (60,0,40) in FIG. 8.

Further, in the case that an amount of a solute is smaller than 5%, since a concentration of a solute becomes thin, it is presumed that a concentration of a solute in the solution is liable to be varied greatly corresponding to a layer growth, and thus it is not possible to form a layer. This composition region is indicated by a line K connecting a point S (95,5,0) and a point T (95,2,3) in FIG. 8. It should be noted that this composition region is of course surrounded by a line G connecting a point S (95,5,0) and a point C (60,40,0).

Although, the case using the lithium niobate crystal substrate was explained, it has been confirmed that the relations mentioned above can be fully applied to the case using the substrate made of a solid solution of lithium niobate and lithium tantalate.

Moreover, in the embodiments mentioned above, V$_2$O$_5$ was used as a flux. However, it has also been confirmed that the same result can be obtained if B$_2$O$_3$, MoO$_3$, or WO$_3$ is used as the flux instead of V$_2$O$_5$.

In the optical waveguide substrate shown in FIG. 2a, if a layer having a composition of LiNb$_{1-x}$Ta$_x$O$_3$ is formed by a liquid phase epitaxial method on a substrate having a composition of LiNb$_{1-z}$Ta$_z$O$_3$ (0<z≦0.8) mentioned above or LiNbO$_3$, the epitaxial layer thus obtained can be used as an optical waveguide as it is. In this case, x is 0.8 at maximum, and it is preferred to use x larger than 0.02.

In the optical waveguide substrate shown in FIG. 2b, a first ferroelectric optical single crystal layer having a composition of LiNb$_{1-x}$Ta$_x$O$_3$ is formed by a liquid phase epitaxial method on a substrate having a composition of LiNb$_{1-z}$Ta$_z$O$_3$ (0<z≦0.8) mentioned above or LiNbO$_3$, and then a second layer is formed by a liquid phase epitaxial method on the first layer. Here, the second layer has a composition of LiNb$_{1-y}$Ta$_y$O$_3$ (0<y≦0.8), and a relation of y<x is satisfied. Therefore, the second layer can be used as an optical waveguide as it is.

In the explanations mentioned above, respective composition impressions shown by LiNb$_{1-z}$Ta$_z$O$_3$, LiNb$_{1-x}$Ta$_x$O$_3$ and LiNb$_{1-y}$Ta$_y$O$_3$ are idiomatic expressions in this technical field, and normally in the respective composition impressions an amount ratio between an atom (Li) consisting of A site and atoms (Nb and Ta) consisting B site is not indicated.

Then, as a method of producing an optical waveguide, the known titanium doping process or proton exchanging process can be used to form a two dimensional optical waveguide. In the case that a three dimensional optical waveguide is formed on a planar device, since a diffusion source is diffused in a two dimensional manner in the planar device, it is difficult to control a diffusion (i.e., an refractive index). Contrary to this, in the case that a two dimensional optical waveguide is formed on a plane and a ridge portion is formed by a mechanical working according to the present invention, since a diffusion source is diffused in a one dimensional manner in a substrate, it is easy to control a diffusion (i.e., an refractive index).

A cross sectional shape of the optical waveguide is not limited, but it is preferred to use the optical waveguide having a substantially square cross section so as to improve a symmetric property of a light beam and to reduce a transmission loss of a light efficiently. Moreover, if a ratio of d/W is set to larger than 1.0, it is preferred since an electric field applied to the optical waveguide in the ridge portion will not widen to the substrate. Further, if a ratio of d/W is set to smaller than 10, it is easy to treat the optical waveguide substrate having the ridge portion and thus a fracture of the ridge portion during treating the substrate is not easily generated. Furthermore, if a ratio of d/W is set to larger than 1.1 preferably larger than 1.2, it is possible to reduce an extinction ratio much more. In addition, if a ratio of d/W is set to smaller than 3.0 preferably smaller than 2.0, it is possible to reduce a driving voltage of the device much more.

EXAMPLE 1

According to the method mentioned above with reference to FIGS. 1b, 1c and 2b, the optical waveguide substrate shown in FIG. 2b was produced. In this case, the lithium niobate single crystal substrate 1 having an optical grade was used. A dimension of the substrate 1 was a diameter of 75 mm and a thickness of 1 mm. On the substrate 1, the single crystal layer 4 made of lithium niobate-lithium tantalate was formed by a liquid phase epitaxial method.

That is to say, a solution having a pseudo-ternary composition of $LiNbO_3$—$LiTaO_3$—$LiVO_3$ was prepared. An amount ratio of respective components in the solution was $LiNbO_3$:$LiTaO_3$:$LiVO_3$=4:15:80. Then, the solution was stirred in a crucible for more than 3 hours at a sufficiently high temperature (1200° C.) to obtain a solution having a sufficiently uniform liquid phase. After that, the solution was cooled to 95° C., and was maintained for more than 12 hours at this temperature. As a result, a nucleus of solid solution due to a supersaturation was generated in the solution and a solid phase was precipitated on a wall surface of the crucible. In this case, a liquid phase portion in the solution was a supersaturation state at 950° C., and the solution had a liquid phase portion and a solid phase portion.

After that, a temperature of the solution was cooled from 950° C. to a layer forming temperature of 940° C. Then, a lithium niobate single crystal substrate was contacted with the liquid phase portion immediately to form a layer. The thus obtained solid solution layer 4 had a composition of $LiNb_{0.70}Ta_{0.30}O_3$. Moreover, a thickness of the layer 4 was 20 μm.

On the solid solution layer 4, the lithium niobate layer 3 was formed by a liquid phase epitaxial method as follows. At first, a solution having a pseudo-binary composition of $LiNbO_3$—$LiVO_3$ was prepared. An amount ratio of respective components in the solution was $LiNbO_3$:$LiVO_3$=20:80. Then, the solution was stirred in a crucible for more than 3 hours at a sufficiently high temperature (1200° C.) to obtain a solution having a sufficiently uniform liquid phase. After that, the solution was cooled to 905° C., and was maintained for more than 12 hours at this temperature. As a result, a nucleus of solid solution due to a supersaturation was generated in the solution and a solid phase was precipitated on a wall surface of the crucible.

After that, a temperature of the solution was cooled from 905° C. to a layer forming temperature of 900° C. Then, a lithium niobate single crystal substrate 1 was contacted with the liquid phase portion immediately to form a layer. The thus obtained lithium niobate single crystal layer 3 had a thickness of about 5 μpm.

The thus obtained substrate 1, layers 3 and 4 were subjected to a mechanical working by using a micro grinder to form the ridge portion having a width of 5 μm and a height of 50 μm. In this case, the ridge angle was substantially 90°.

With respect to the thus formed optical waveguide 18 in the ridge portion, a semiconductor laser having a wavelength of 830 nm was projected. As a result, a transmission loss was about 0.3 dB/cm. Moreover, even if a emanating light having a power of 10 mW was projected, a property damage such as a optical fracture was not detected at all.

COMPARATIVE EXAMPLE 1

As is the same as the example 1, the solid solution single crystal layer 3 were successively formed on the lithium niobate single crystal layer 1. Then, the ridge portion having a width of 5 μm and a height of 5 μm was formed by an ion trimming method using argon gas. With respect to the thus formed optical waveguide in the ridge portion, a semiconductor laser having a wavelength of 830 nm1 was projected. As a result, a transmission loss was about 5 dB/cm. Moreover, if an emanating light having a power of 2 mW was projected, an optical fracture was detected and a pattern of light beam was disarranged.

EXAMPLE 2

The optical waveguide device shown in FIG. 3b (light phase modulator) was produced. As is the same as the example 1, the assembly 5B in which the layers 4 and 3 were formed on the substrate 1 was produced. In this case, a lithium niobate Z plate was used as the substrate, and a thickness of the single crystal layer 3 was 8 μm. Then, the ridge portion having a width of 8 μm and a height of 15 μm was formed by a mechanical working using a micro grinder. The ridge angle of the ridge portion was substantially 90°.

On the top portion 18a and the base portion 14a of the ridge portion, $SiO_2$ layer having a thickness of 2000 angstrom was formed by an EB (electron beam) evaporation method. Then, on the $SiO_2$ layer, the electrodes 21A and 21C were formed by an EB evaporation method. In this case, the electrode 21A was formed by a Cr layer having a thickness of 1000 angstrom, and the electrodes 21C were formed by an Au layer having a thickness of 1000 angstrom.

The properties of the light phase modulator thus formed were estimated by using a laser light having a wavelength of 1.3 μm. As a result, a transmission loss was about 0.3 dB/cm, and a driving voltage was 1 V, and an extinction ratio was larger than 35 dB. Moreover, if a semiconductor laser light having a wavelength of 830 μm was incident upon the optical waveguide, a property damage such as an optical fracture was not detected at all.

COMPARATIVE EXAMPLE 2

As is the same as the example 2, the electrode was formed on the top surface of the ridge portion of the assembly 5B. Then, the ridge portion having a width of 5 μm and a height of 5 μm was formed by an ion trimming method using argon gas. Moreover, the electrodes were formed on a surface of the base portion of the ridge portion as is the same as the example 2 to produce the light phase modulator. In this case, the ridge angle was substantially 80°. The properties of the light phase modulator were estimated by using a laser light having a wavelength of 1.3 μm. As a result, a transmission loss was about 5 dB/cm, a driving voltage was 3 V, and an extinction ratio was 23 dB. Moreover, if a semiconductor laser having a wavelength of 830 nm was projected, an optical fracture was generated and a pattern of the light beam was disarranged with respect to an emanating light having a power of 2 mW.

EXAMPLE 3

In the example 1, the substrate was polarized in a single direction perpendicular to the main plane of the lithium niobate substrate. Then, as is the same as the example 1, the first and the second epitaxial layers were formed. On the second epitaxial layer, the periodic electrodes were formed by a photolithography technique, and on a rear surface of the substrate, a uniform electrode was formed. Then, the thus formed substrate was heated at about 1000° C. and a pulse voltage of about 200 kV/cm was applied thereto to form the periodic polarization inversion construction.

The thus formed periodic polarization inversion construction was used for the second harmonic generation device. In this case, if a semiconductor laser light having a wavelength of 830 nm was impinged upon the periodic polarization inversion construction of the second layer, a second harmonic having a wavelength of 415 nm and an output of about 25 mW was obtained with respect to an incident light power of 100 mW. Moreover, a property damage such as an optical fracture was not detected.

As mentioned above, according to the invention, in the case that the ridge type optical waveguide is formed on the ferroelectric optical single crystal substrate, a light transmission loss can be reduced much more, and a coupling loss with the optical fiber can be also reduced much more. Moreover, in the case that the optical waveguide is applied for the single mode optical waveguide, an extinction ratio can be increased. Further, in the case that the electrodes for a light modulation is formed on the optical waveguide substrate to provide the optical waveguide device, an electric field applying efficiency can be improved, and a driving voltage necessary for modulating light can be reduced.

What is claimed:

1. An optical waveguide device, comprising:

an optical waveguide substrate having an inorganic substrate made of ferroelectric optical single crystal and a ridge portion projected from a main plane of said inorganic substrate, wherein said ridge portion has a base portion made of ferroelectric optical single crystal and an optical waveguide formed on said base portion, and said ferroelectric optical crystal comprises an electrooptical single crystal, a pair of electrodes for applying a voltage for modulating light transmitted through said optical waveguide, and a power supply device for supplying power to said pair of electrodes.

2. The optical waveguide device according to claim 1, wherein one of said electrodes is arranged on a top surface of said ridge portion and the other electrode is arranged on a rear main plane of said inorganic substrate opposed to said ridge portion.

3. The optical waveguide device according to claim 1, wherein one of said electrodes is arranged on a top surface of said ridge portion and the other electrode is arranged on a surface of said base portion.

4. The optical waveguide device according to claim 3, wherein a ratio of $d_2/d_1$ between a height $d_1$ of said optical waveguide portion and a height $d_2$ from said top surface of said ridge portion to an upper end of said other electrode is larger than 1 and smaller than 3.

5. The optical waveguide device according to claim 4, wherein said pair of electrodes are formed on a surface of said optical waveguide so as to sandwich said optical waveguide.

6. A second harmonic generation device of quasi phase matched type having an inorganic substrate made of ferroelectric optical single crystal and a ridge portion projected from a main plane of said inorganic substrate comprising a construction such that said ridge portion has a base portion made of ferroelectric optical single crystal and an optical waveguide formed on said base portion, and a periodic polarization inversion construction is formed in said optical waveguide.

7. The device of claim 6, wherein said ridge portion is formed using a mechanical working means such that a ratio d/W between a height (d) and a width (W) of said ridge portion is larger than 1.0 and smaller than 10.0.

* * * * *